(12) United States Patent
Le Pannerer et al.

(10) Patent No.: US 10,139,110 B2
(45) Date of Patent: Nov. 27, 2018

(54) BEARING ELEMENT TO CUSHION AXIAL DISPLACEMENTS OF A SLIDING TRAVERSE OF AN INJECTION SYSTEM FOR A TURBOMACHINE

(71) Applicant: Safran Aircraft Engines, Paris (FR)

(72) Inventors: Brice Marie Yves Emile Le Pannerer, Melun (FR); Jean-François Cabre, Pringy (FR); Galadriel Dancie, Crisenoy (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 111 days.

(21) Appl. No.: 15/259,803

(22) Filed: Sep. 8, 2016

(65) Prior Publication Data
US 2017/0067638 A1 Mar. 9, 2017

(30) Foreign Application Priority Data
Sep. 9, 2015 (FR) ...................................... 15 58374

(51) Int. Cl.
*F02C 1/00* (2006.01)
*F23R 3/28* (2006.01)
*F23R 3/14* (2006.01)

(52) U.S. Cl.
CPC ................ *F23R 3/283* (2013.01); *F23R 3/14* (2013.01); *Y02T 50/675* (2013.01)

(58) Field of Classification Search
CPC .. F23R 3/283; F23R 3/60; F23R 3/002; F23R 3/22; F23R 3/14; Y02T 50/675
See application file for complete search history.

(56) References Cited

U.S. PATENT DOCUMENTS

| 4,454,711 A | | 6/1984 | Ben-Porat | |
| 5,490,389 A | * | 2/1996 | Harrison | ................... F23R 3/10 60/737 |
| 6,453,675 B1 | * | 9/2002 | Royle | ..................... F23R 3/007 60/800 |

(Continued)

FOREIGN PATENT DOCUMENTS

| EP | 1 731 837 A2 | 12/2006 |
| FR | 2 832 493 A1 | 5/2003 |
| FR | 2 911 666 A1 | 7/2008 |

OTHER PUBLICATIONS

Search Report issued in French Patent Application No. FR 1558374 dated Jul. 6, 2016.

*Primary Examiner* — Jesse Bogue
(74) *Attorney, Agent, or Firm* — Pearne & Gordon LLP (57) ABSTRACT

A turbomachine combustion chamber, comprises a fuel injector nozzle and an injection system. The injection system comprises a sliding traverse, means for maintaining the sliding traverse and a supporting sole for the sliding traverse. The injection system comprises means for recalling the sliding traverse configured to stress the supporting sole against axial displacements of the sliding traverse relatively to the means for maintaining. The outer connection surface of the injector nozzle and/or at least one portion of the internal centring surface of the sliding traverse narrow in the downstream direction, in such a way as to retain the injector nozzle relatively to the sliding traverse axially in the downstream direction.

17 Claims, 4 Drawing Sheets

(56) References Cited

U.S. PATENT DOCUMENTS

| | | | | |
|---|---|---|---|---|
| 6,880,341 B2* | 4/2005 | Parkman | ............. | F23R 3/283 |
| | | | | 60/740 |
| 7,140,189 B2* | 11/2006 | Markarian | ............. | F23R 3/10 |
| | | | | 60/796 |
| 7,730,725 B2* | 6/2010 | Faulder | ............. | F23R 3/002 |
| | | | | 60/752 |
| 7,926,280 B2* | 4/2011 | Morenko | ............. | F23R 3/002 |
| | | | | 60/740 |
| 8,689,563 B2* | 4/2014 | Low | ............. | F23R 3/14 |
| | | | | 60/737 |
| 2003/0131600 A1 | 7/2003 | David | | |
| 2007/0033950 A1 | 2/2007 | Bernier | | |
| 2015/0285500 A1 | 10/2015 | Alain | | |

* cited by examiner

BEARING ELEMENT TO CUSHION AXIAL DISPLACEMENTS OF A SLIDING TRAVERSE OF AN INJECTION SYSTEM FOR A TURBOMACHINE

TECHNICAL FIELD

The invention relates to combustion chambers for an aircraft turbomachine. It relates in particular to fuel injectors and injection systems for an air-fuel mixture, for a combustion chamber.

PRIOR ART

A conventional injection system for an air-fuel mixture in a combustion chamber of an aircraft turbomachine is for example known in patent application EP 1 731 837 A2.

The injection system comprises a fixed portion with respect to the combustion chamber. The fixed portion comprises a mixing bowl, a venturi and an air swirler. The venturi and the air swirler are located upstream of the mixing bowl.

The injection system further comprises a sliding traverse which is mobile radially with respect to the fixed portion. The sliding traverse houses the injector nozzle. The sliding traverse compensates at least partially the misalignments of the injector with respect to the injection system in operation and/or during the assembly of the injector and of the injection system in the combustion chamber.

The sliding traverse and the associated injector are subjected to premature wear and tear on the sphere-cylinder contact surface of the injector nozzle and of the sliding traverse. This wear and tear is in particular generated by the misalignments of the injector with respect to the injection system.

An undesirable gap is then created between the sliding traverse and the injector nozzle. This gap has primarily for consequence the generation of an uncontrolled additional flow of air in the direction of the bottom of the combustion chamber. Generally, this results in a lowering of the performance of the combustion chamber.

In addition, the condition of the wear and tear of the sliding traverse and of the injector can require the replacing of the injector.

There is therefore a need to limit the wear and tear of the injector nozzle and of the sliding traverse, while still continuing to compensate the misalignments of the injector and of the sliding traverse, in particular those coming from the manufacturing tolerances and/or the assembly in the combustion chamber.

DISCLOSURE OF THE INVENTION

The invention aims to overcome at least partially the problems encountered in the solutions of prior art.

In this respect, the invention has for object an arrangement for a turbomachine combustion chamber. The arrangement comprises a fuel injector nozzle and an injection system for a turbomachine.

The injector nozzle comprises an outer connection surface.

The injection system extends substantially longitudinally along an injection system axis. The injection system comprises a sliding traverse, means for maintaining the sliding traverse.

The sliding traverse comprises a supporting sole and a centring portion configured to house the injector nozzle. The supporting sole is mechanically connected to the centring portion, protruding from the centring portion. The centring portion comprises an internal centring surface configured to be in mechanical contact with the outer connection surface.

The means for maintaining the sliding traverse delimit between them a housing space for the supporting sole.

According to the invention, the arrangement comprises means for recalling the sliding traverse configured to axially stress the supporting sole against the axial displacements downstream of the sliding traverse relatively to the means for maintaining the sliding traverse.

According to the invention, the outer connection surface and/or at least one portion of the internal centring surface narrow in the downstream direction, in such a way as to retain the injector nozzle relatively to the sliding traverse axially in the downstream direction.

The centring surface and the connection surface, as well as the means for recalling the sliding traverse make it possible to replace a region of axial offset of the injector nozzle relatively to the sliding traverse with a region of axial offset of the sliding traverse relatively to the edge of the housing. The wear and tear at the interface between the injector nozzle and the sliding traverse is therefore reduced. Air and fuel leaks are then decreased.

The internal centring surface and the outer connection surface favour a contact without axial sliding downstream of the injector relatively to the sliding traverse, in particular in opposition to a sphere-cylinder connection of the sliding traverse and of the injector nozzle.

The invention can optionally comprise one or several of the following characteristics individually or combinations thereof.

According to a particular embodiment, the internal centring surface narrows downstream, being more preferably substantially truncated.

Advantageously, the injector nozzle comprises an outer connection surface substantially truncated or at least partially spherical, more preferably intended to form a cone-cone or sphere-cone connection with the internal centring surface.

According to an advantageous embodiment, the means for recalling the sliding traverse include at least one elastic element located in the housing space, the elastic element being configured to cushion the axial displacements of the supporting sole relatively to the means for maintaining the sliding traverse.

Advantageously, the elastic element comprises a portion of surface that is substantially flat whereon the supporting sole is configured to press.

Preferably, the elastic bearing element comprises an inclined portion with respect to the axis of the injection system. The inclined portion preferably comprises at least one first end configured to bear on the means for maintaining the sliding traverse.

According to another particular embodiment, the injection system is at least partially annular about the axis of the injection system, with the elastic element comprising an elastic washer extending from 0° C. to 360° about the axis of the injection system.

According to another advantageous embodiment, the injection system comprises a sealing segment located in the housing space and configured to bear on the supporting sole and/or the means for recalling the sliding traverse.

According to another particular embodiment, the means for maintaining the sliding traverse comprise a housing edge open axially and a closing element configured to close at least partially axially the housing space.

Preferably, the closing element comprises a scalloped washer and/or the closing element comprises at least one pin extending according to a direction that has a radial component relatively to the axis of the injection system.

According to an advantageous embodiment, the supporting sole is rigidly integral with the centring portion, and is preferably a single piece with the centring portion.

According to another alternative embodiment, the supporting sole is mechanically connected to the centring portion, in such a way that the centring portion is at least partially free in rotation about a second axis of rotation orthogonal to the axis of the injection system. The centring portion is more preferably mechanically connected to the supporting sole according to a ball-joint connection.

The invention also relates to a combustion chamber for a turbomachine, comprising an arrangement such as defined hereinabove.

The invention finally relates to a turbomachine comprising a combustion chamber such as defined hereinabove. The turbomachine is preferably a turbomachine for aircraft, such as a turbojet engine or a turboprop engine.

BRIEF DESCRIPTION OF THE DRAWINGS

This invention shall be better understood when reading the description of embodiments, solely for the purposes of information and in no way limiting, with reference to the annexed drawings wherein.

DETAILED DISCLOSURE OF PARTICULAR EMBODIMENTS

Identical, similar or equivalent portions of the various figures bear the same numerical references in order to facilitate passing from one figure to another.

Figure 1:
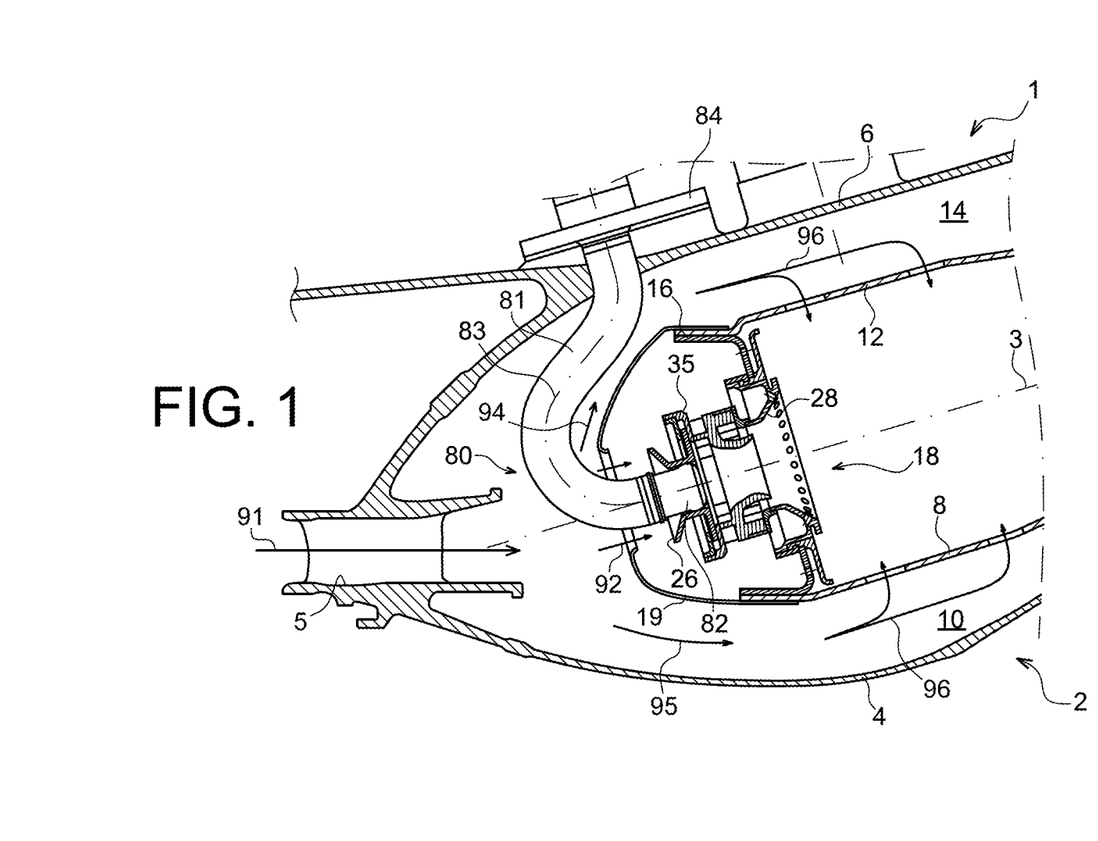
FIG. 1 shows a partial diagrammatical view as a longitudinal half-section of a combustion chamber for a turbomachine, comprising an arrangement according to a first embodiment of the invention.

FIG. 1 diagrammatically shows a combustion chamber 2 of a turbomachine 1 of an aircraft, annular about an axis 3 of the combustion chamber.

The combustion chamber 2 comprises a fixed inner housing wall 4 and an outer housing wall 6. The outer housing wall 6 delimits with an upper chamber wall 12 a passage 14 for the flow of air. Likewise, the inner housing wall 4 defines with a lower chamber wall 8 a second passage 10 for the flow of air. The lower 8 and upper 12 walls are connected by a chamber bottom 16.

In all of this document, the "upstream" direction and the "downstream" direction are defined by the general direction of the flow of air and of the fuel in the combustion chamber 2. This direction also corresponds substantially to the direction of the flow of the exhaust gases in the turbomachine 1.

The axial and radial directions are defined with respect to the direction of the longitudinal axis of the injection system X-X. The directions of the axes Y-Y and Z-Z are for example radial directions. The first radial axis Z-Z and the second radial axis Y-Y are orthogonal between them and with respect to the axis of the injection system X-X.

The adjectives inner and outer on the one hand and lower and upper on the other hand are defined with respect to the axis of the injection system X-X and/or with respect to the axis 3 of the combustion chamber which is substantially confounded with the longitudinal axis of the turbomachine 1.

The combustion chamber 2 comprises a plurality of injection systems 18 and fuel injectors 80. Only one injection system 18 and the associated fuel injector 80 are visible in FIG. 1.

Figure 2:
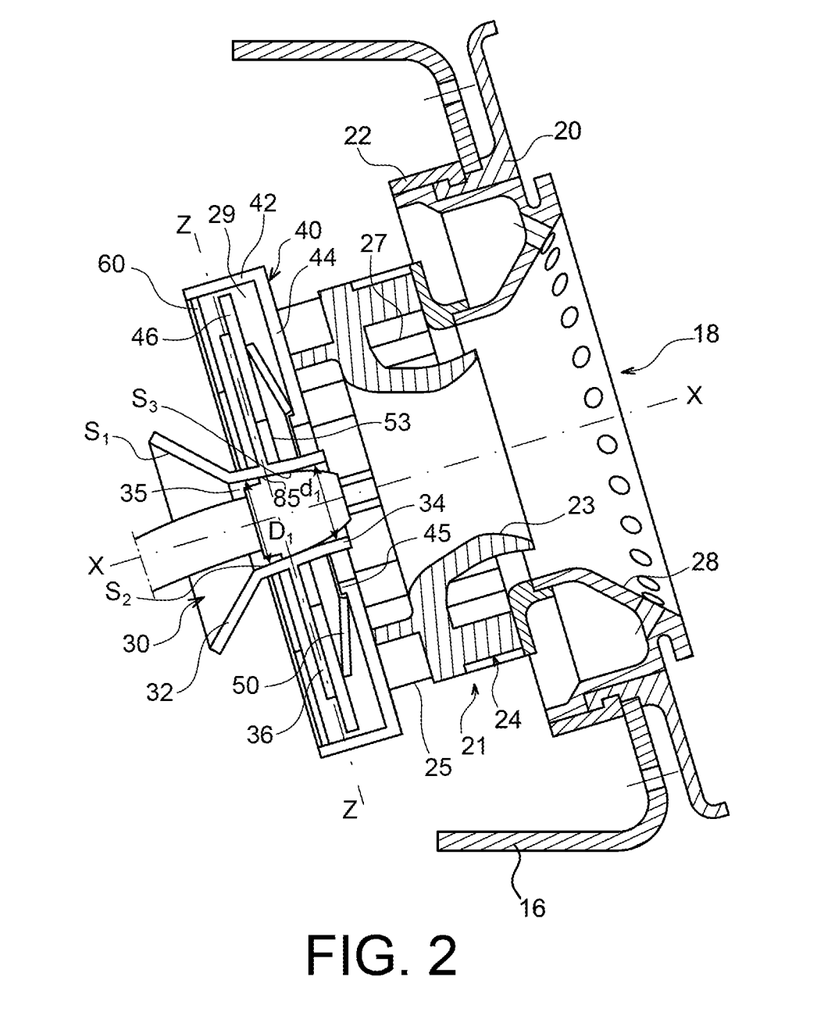
FIG. 2 shows an enlarged partial diagrammatical view as a longitudinal cross-section of the arrangement according to the first embodiment.

With reference to FIGS. 1 and 2, the fuel injector 80 is annular about an axis of injector 83. It comprises an injection pipe 81 and an injector nozzle 82. The injection pipe 81 is fixed at its first longitudinal end to the outer housing wall 6 by a fastening plate 84, with the injector nozzle 82 being fixed to the second longitudinal end of the injection pipe 81, opposite the first end.

The injector nozzle 82 is designed to be housed in an opening 35 of the sliding traverse 30 of the injection system 18. The injector nozzle 82 comprises a portion of engagement 85 delimiting an outer tapered connection surface $S_3$ configured to be in mechanical contact with the sliding traverse 30. The outer connection surface $S_3$ is intended to form a cone-cone connection with the internal centring surface $S_2$ delimited by the opening 35 of the sliding traverse 30. This cone-cone connection axially retains the injector nozzle 82 downstream relatively to the centring portion 34.

The internal centring surface $S_2$ has in particular at least one diameter $d_1$ that is less than a diameter $D_1$ of the outer connection surface $S_3$.

The cone-cone connection allows for a particularly fine adjustment of the injector nozzle 82 in the sliding traverse 30, when the internal centring surface $S_2$ and the outer connection surface $S_3$ have a shape that is substantially complementary.

The injection system 18 comprises the sliding traverse 30 and a fixed downstream portion 21. The sliding traverse 30 is mounted mobile with respect to this fixed downstream portion 21.

The fixed downstream portion 21 comprises, from upstream to downstream, a housing edge 40 of the sliding traverse, a swirler 24, a venturi 23 and a mixing bowl 28 fixed to the bottom of the chamber 16. The fixed downstream portion 21 is generally rotationally symmetric about an axis of revolution X-X of the mixing bowl 28. The longitudinal axis of the injection system X-X is substantially confounded with the axis of the mixing bowl 28.

The mixing bowl 28 has a flared shape substantially of revolution about the X axis-X of the mixing bowl 28. It is connected to the bottom of the chamber 16 by the intermediary of a split ring 22 and possibly by a deflector 20.

The swirler 24 is mounted integral with the mixing bowl 28. It comprises a first stage of blades 25 and a second stage of blades 27, which have for function to drive the air in rotation about the axis of the injection system X-X. The blades of the first stage of blades 25 can rotate in the same direction or in the direction opposite those of the second stage of blades 27.

The housing edge 40 has an annular shape of a housing ring. The housing edge 40 comprises a lateral wall 42 and a downstream wall 44 connected to the lateral wall 42. The lateral wall 42 and the downstream wall 44 form a single-piece housing edge 40. The downstream wall 44 comprises and edge 45 protruding axially upstream.

The housing edge 40 partially delimits an annular housing space 29 wherein the sliding traverse 30 is housed. This housing space 29 is closed according to the axis of the injection system X-X downstream by the downstream wall 44 and upstream by a closing element 60 which shall be described in detail with reference to FIGS. 3 and 4. The housing edge 40 and the closing element 60 form means for maintaining the sliding traverse 30 relatively to the downstream portion the downstream portion 21.

The sliding traverse 30 is annular about an axis of the sliding traverse which is confounded with the longitudinal axis of the injection system X-X, in FIG. 2. The axis of the sliding traverse is however able to be inclined with respect to the axis of the injection system X-X.

The sliding traverse 30 is a single piece, i.e. it is formed from a single piece.

The sliding traverse 30 comprises a pre-centring portion 32 which has a flared shape, for example truncated, and a cylindrical centring portion 34 that extends the pre-centring portion 32 and which opens into the pre-centring portion 32.

The centring portion 34 is delimited inwards by the internal centring surface $S_2$ which is truncated with a lower inclination with respect to the axis of the injection system X-X than the inner surface $S_1$ of the pre-centring portion 32.

The pre-centring portion 32 is designed to pre-centre the fuel injector 80 in the sliding traverse 30, in such a way as to facilitate the insertion of the injector nozzle 82 into the centring portion 34.

The centring portion 34 makes it possible to mechanically connect the injector 80 to the fixed downstream portion 21 of the injection system 18, by centring the injector 80 relatively to the fixed downstream portion 21. The mechanical connection between the sliding traverse 30 and the injector 80 makes it possible to compensate at least partially the misalignments of the injector nozzle 82 relatively to the fixed downstream portion 21.

These misalignments stem in particular from the manufacturing tolerances of the injector 80 and of the injection system 18, assembly tolerances of the injector 80 and of the injection system 18 in the combustion chamber 2, and differential dilatations of the injector 80 with respect to the injection system 18.

In the first embodiment, the sliding traverse 30 comprises a supporting sole 36 which substantially takes the shape of a single-piece disc and that is flared at its centre. The supporting sole 36 is rigidly integral with the centring portion 34, protruding from the centring portion 34 into the housing space 29. More precisely, the supporting sole 36 is a single-piece with the centring portion 34.

The supporting sole 36 is configured to axially press on an elastic washer 50 via a sealing segment 46. The supporting sole 36 is located between the closing element 60 on the one hand and the sealing segment 46 according to the direction of the longitudinal axis X-X.

The supporting sole 36 is also configured to slide about the axis of the injection system X-X, bearing flatly on the sealing segment 46.

It is also mobile radially via sliding on the sealing segment 46, so as to allow for a radial offset of the centring portion 34 relatively to the fixed downstream portion 31.

The sealing segment 46 also takes the shape of a flared disc at its centre and located around the centring portion 34. It is located axially between the supporting sole 36 and the elastic bearing element 50.

The sealing segment 46 limits air and fuel leaks in the housing space 29. To do this, the outer radius of this disc is greater than that of the supporting sole 36. The sealing segment 46 is substantially immobile radially with respect to the axis of the injection system X-X, contrary to the supporting sole 36. However, the sealing segment 46 is mobile along the longitudinal axis X-X under the effect of the thrust of the supporting sole 36 and/or of the elastic washer 50.

The elastic washer 50 is for example made of nickel or of a nickel alloy. It comprises a portion of surface substantially flat 53 that has the shape of a flared disc at its centre and an inclined portion 51 axially opposite the flat portion of surface 53. The elastic washer 50 extends from 0° to 360° about the axis of the injection system X-X.

The inclined portion 51 is substantially flat, being inclined with respect to the axis of the injection system X-X and with respect to the axis radial Z-Z. It comprises a first end 52 configured to bear on the housing edge 40, in particular on the edge 45, and a second end 54 radially opposite the first end. The inclined portion 51 facilitates the compression of the bearing element 50 according to the direction of the axis of the injection system X-X.

The elastic washer 50 plays the role of means for recalling the sliding traverse 30. The elastic washer 50 is configured to mechanically stress the supporting sole 36 against axial offsets of the sliding traverse 30 relatively to the downstream portion 21.

The elastic washer 50 cushions the axial displacements of the sliding traverse 30, by the bearing of the supporting sole 36 on the sealing element 46 that transmits the axial displacements from the supporting sole 36 to the elastic washer 50. The axial displacements of the sliding traverse 30 are cushioned by the crushing of the elastic washer 50 according to the axial direction.

The region of axial offset of the unit formed by the sliding traverse 30 and the injector nozzle 82 is located radially at a distance from the axis of the injector system X-X, on the bearing zone of the supporting sole 36 on the sealing segment 46, which generates wear and tear in this zone rather than at the interface between the injector nozzle 82 and the sliding traverse 30. From this stems a reduction in air and fuel leaks in the injection system 18.

Figure 3:
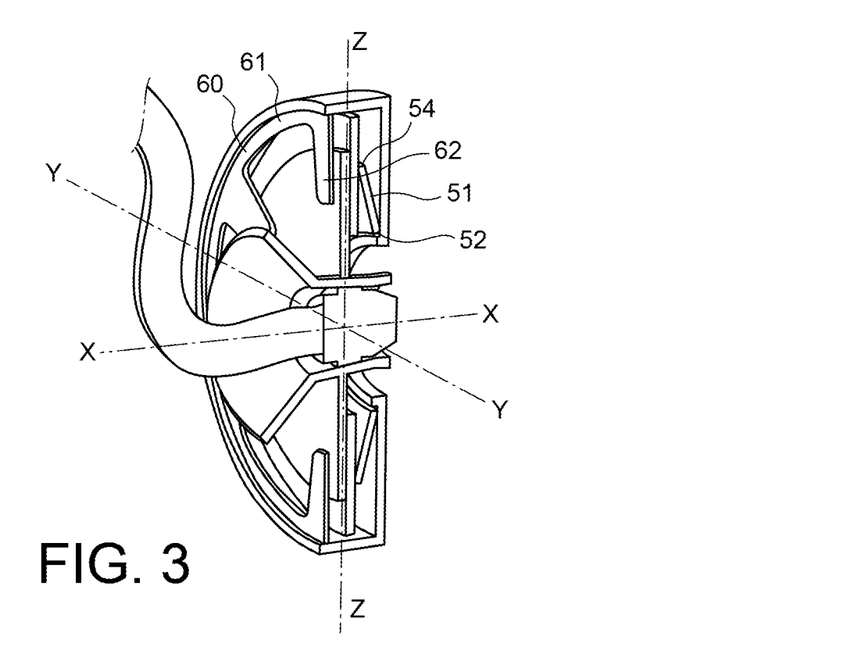
FIG. 3 shows a partial diagrammatical view in perspective of the arrangement for a turbomachine, according to the first embodiment of the invention.

With reference to FIG. 3, the closing element 60 comprises an annular collar 61 that bears against the lateral wall 42 of the housing edge 40, as well as a plurality of scallops 62 spaced angularly from one another about the axis of the injection system X-X. The scallops 62 each extend substantially radially to the axis of the injection system X-X, in order to retain the supporting sole 36 axially in the housing space 29.

With reference again to FIG. 1 and to FIG. 2, the combustion chamber 2, and in particular each injection system 18, are supplied in the direction of the arrow 91 with air under pressure on passage 5. This air under pressure is used for the combustion or the cooling of the combustion chamber 2. A portion of this air is introduced into the combustion chamber 2 on the central opening of the fairing 19, as diagrammed by the arrow 92, while another portion of the air flows to the passages 10 and 14 for the flow of air respectively according to the directions 94 and 95 then according to the direction 96. The flow of air diagrammed by the arrows 96 then penetrates into the combustion chamber 2 via primary orifices and dilution orifices.

A portion of the air coming from the flow according to the arrows 92 supplied the injection system 18 on the purge holes and on the blades of swirler 24 of the fixed downstream portion 21 of the injection system 18.

Figure 4:
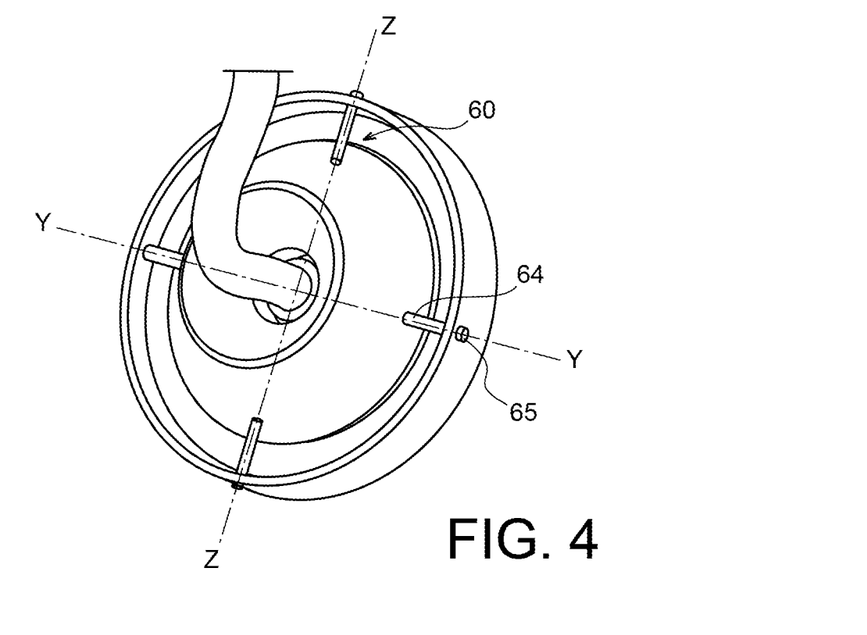
FIG. 4 shows a partial diagrammatical view in perspective of the arrangement for a turbomachine, according to the second embodiment of the invention.

FIG. 4 shows a second embodiment of the invention which is differentiated from the first embodiment by the structure of the closing element 60. The closing element 60 comprises pins 64 angularly spaced from one another about the axis of the injection system X-X, in place of the scallops 62.

The pins 64 extend radially according to their longitudinal direction. They are fretted in the openings 65 carried out in the lateral wall 42.

Figure 5:
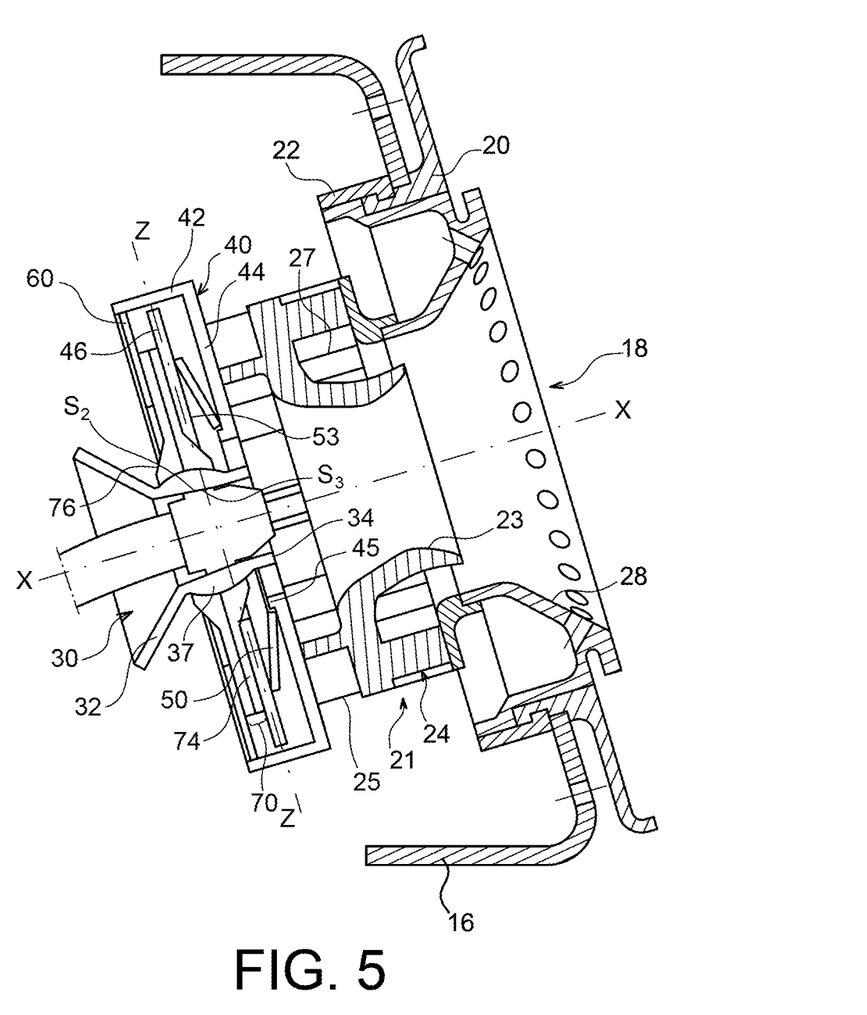
FIG. 5 shows an enlarged diagrammatical view as a longitudinal cross-section of the arrangement according to a third embodiment.

The third embodiment, shown with reference to FIG. 5, in distinguished from the first embodiment by the structure of the supporting sole 70, and by that of the centring portion 34.

The supporting sole 70 is no longer a part of the centring portion 34 but is mechanically connected by a ball-joint connection to the centring portion 34.

The supporting sole 70 comprises a first segment 71 and a second segment 72 attached to the first segment 71 according to the direction of the axis of the injection system X-X in order to facilitate the assembly of the injection system 18. The second segment 72 is rigidly integral with the first segment 71.

The first segment 71 comprises an inner edge 76 and an outer edge 74 at its two radially opposite ends. The inner edge 76 defines a spherical recess portion that mechanically cooperates with a spherical bearing portion 37 of the centring portion 34 in order to form a ball-joint connection of the sliding traverse 30 relatively to the downstream portion 21.

The carrying out of the supporting sole 70 as several segments 71, 72 facilitates the assembly of the sliding traverse 30 according to a ball-joint connection with respect to the downstream portion 21. In particular, the sliding traverse 30 is mobile in rotation relatively to the fixed downstream portion 21 about the axis of the injection system, about the first radial axis Z-Z and about the second radial axis Y-Y.

The supporting sole 70 is radially mobile by sliding against the sealing segment 46. It is mobile axially by pressing on the elastic washer 50 via the sealing segment 46.

The second segment 72 is axially located between the first segment 71 and the sealing segment 46. The second segment 72 is intended to bear on the sealing segment 46 in order to press on the bearing element 50. This second segment 72 is symmetrical with the first segment 71 with respect to a radial plane at the junction of the first segment 71 and of the second segment 72.

The spherical bearing portion 37 has the shape of a boss protruding radially outwards from the rest of the centring portion 34 in order to form the ball-joint connection of the centring portion 34 relatively to the supporting sole 70.

Of course, various modifications can be made by those skilled in the art to the invention that has just been described without leaving the scope of the invention.

The lateral wall 42 can be fixed to the downstream wall 44, instead of being formed from a single part with the downstream wall 44. Moreover, the housing edge 40 could comprise an upstream wall rigidly integral with the lateral wall 42 in order to close the upstream of the housing space 29, in place of the closing element 60.

In the examples shown, the supporting sole 36, 70 bears on a sealing segment 46 and the sealing segment 46 bears on the elastic bearing element 50. The supporting sole 36, 70 can of course be axially located between the sealing segment 46 and the elastic washer 50. Moreover, the supporting sole 36, 70 can also be upstream as well as downstream of the elastic washer 50.

The supporting sole 70 of the arrangement according to the third embodiment can be made from a single part.

In the embodiments shown, the elastic bearing element 50 and the sealing segment 46 extend radially with respect to the axis of the injection system X-X. They are also able to be inclined with respect to this axis.

The portion of engagement 85 of the injector nozzle 82 can be spherical instead of being tapered, in such a way as to form a sphere-cone connection of the injector nozzle 82 with the centring portion 34.

The internal centring surface $S_2$ can be tapered on a portion of the extent of the centring portion 34 according to the direction of the axis of the injection system X-X or over the entire extent of the centring portion 34 according to the direction of the axis of the injection system X-X.

In the third embodiment shown, the bearing portion 37 forms a boss of the centring portion 34. Alternatively, the outer edge 78 could comprise a boss radially protruding to the axis of the injection system X-X and cooperating with a spherical recess of the centring portion 34 in order to form a ball-joint connection of the sliding traverse 30 relatively to the fixed downstream portion 21.

The sealing segment 46 is optional, in particular when the elastic bearing element 50 is radially dimensioned in order to limit leaks in the housing space 29.

The pins 64 of the closing element 60 of the second embodiment could be fixed to the lateral wall 42 by any suitable means other than by fretting, such as by pins or rivets.

The invention claimed is:

1. An arrangement for a turbomachine combustion chamber, comprising:
    a fuel injector nozzle comprising an outer connection surface,
    an injection system for a turbomachine, extending substantially longitudinally along an injection system axis and comprising:
    a sliding traverse comprising a centring portion configured to house the injector nozzle, the centring portion comprising an internal centring surface configured to be in mechanical contact with the outer connection surface,
    a supporting sole rigidly axially connected to the centring portion and protruding from the centring portion,
    means for maintaining the sliding traverse which are delimiting between them a housing space for the supporting sole, wherein the means for maintaining the sliding traverse comprises a housing edge,
    wherein the arrangement comprises means for recalling the sliding traverse, wherein the means for recalling includes at least one elastic element located in the housing space for the supporting sole,
    wherein the elastic element is configured to cushion the axial displacements of the supporting sole relatively to the means for maintaining the sliding traverse, wherein the means for recalling the sliding traverse is configured to axially stress the supporting sole against axial displacements in the downstream direction of the sliding traverse relatively to the means for maintaining the sliding traverse,
    wherein the outer connection surface and/or at least one portion of the internal centring surface narrows in the downstream direction, in such a way as to retain the injector nozzle relatively to the sliding traverse axially in the downstream direction, and
    wherein the housing space is closed upstream by a closing element configured to retain the supporting sole axially in the housing space, further wherein the closing element is spaced from the supporting sole.

2. The arrangement according to claim 1, wherein the portion of the internal centring surface narrows downstream.

3. The arrangement according to claim 2, wherein the portion of the internal centring surface has the shape of a truncated cone.

4. The arrangement according to claim 1, wherein the outer connection surface is substantially truncated or at least partially spherical.

5. The arrangement according to claim 4, wherein the outer connection surface is intended to form a cone-cone or sphere-cone connection with the internal centring surface.

6. The arrangement according to claim 1, wherein the elastic element comprises a portion of surface that is substantially flat whereon the supporting sole is configured to press.

7. The arrangement according to any of claim 1, wherein the injection system is at least partially annular about the axis of the injection system, wherein the elastic element comprises an elastic washer extending from 0° to 360° about the axis of the injection system.

8. The arrangement according to claim 1, wherein the arrangement further comprises a sealing segment located in the housing space, wherein the sealing segment is configured to bear on the supporting sole and/or wherein the sealing segment is configured to bear on the means for recalling the sliding traverse.

9. The arrangement according to claim 1, wherein the supporting sole is rigidly integral with the centring portion.

10. The arrangement according to claim 9, wherein the supporting sole is of a single piece with the centring portion.

11. The arrangement according to claim 1, wherein the supporting sole is mechanically connected to the centring portion, in such a way that the centring portion is at least partially free in rotation about a second axis of rotation orthogonal to the axis of the injection system.

12. The arrangement according to claim 11, wherein the centring portion is mechanically connected to the supporting sole according to a ball joint connection.

13. A combustion chamber for a turbomachine, comprising the arrangement according to claim 1.

14. The arrangement according to claim 1, wherein the elastic element is arranged downstream from the supporting sole, between the supporting sole and a wall of the housing edge.

15. The arrangement according to claim 8, wherein the elastic element is arranged downstream from the supporting sole, between the sealing segment and a wall of the housing edge.

16. The arrangement according to claim 1, wherein the elastic element includes an inclined portion that extends oblique to the injection system axis.

17. The arrangement according to claim 1, wherein the sliding traverse has an inlet opening and an outlet opening downstream of the inlet opening, wherein the outlet opening is smaller in diameter than the inlet opening.

* * * * *